United States Patent [19]

Benjey

[11] Patent Number: 5,083,583
[45] Date of Patent: Jan. 28, 1992

[54] FUEL TANK VAPOR VENT VALVE AND SEAL

[75] Inventors: Robert P. Benjey, Dexter, Mich.

[73] Assignee: G.T. Products, Inc., Ann Arbor, Mich.

[21] Appl. No.: 576,994

[22] Filed: Sep. 4, 1990

[51] Int. Cl.⁵ .............................................. F16K 51/00
[52] U.S. Cl. .................................. 137/587; 251/144; 285/361
[58] Field of Search ............. 137/315, 351, 587, 588, 137/798; 251/144, 148; 285/208, 209, 210, 360, 361, 376, 396, 401, 402; 267/161, 162

[56] References Cited

U.S. PATENT DOCUMENTS

| | | | |
|---|---|---|---|
| 744,646 | 11/1903 | Tietz | 285/376 |
| 2,675,225 | 4/1954 | Migny | 267/162 |
| 2,860,656 | 11/1958 | Eshbaugh | 137/587 |
| 3,232,644 | 2/1966 | Pfeifer et al. | 285/361 |
| 3,314,446 | 4/1967 | Saunders | 285/361 |
| 3,470,524 | 9/1969 | Culver | 285/361 |
| 4,449,737 | 5/1984 | Specht | 285/360 |
| 4,546,789 | 10/1985 | Taylor | 285/361 |
| 4,842,010 | 6/1989 | Edgecomb et al. | 285/360 |
| 4,966,189 | 10/1990 | Harris | 137/587 |

FOREIGN PATENT DOCUMENTS

| | | | |
|---|---|---|---|
| 187788 | 2/1964 | Sweden | 267/162 |
| 857611 | 1/1961 | United Kingdom | 267/162 |

Primary Examiner—John Rivell
Attorney, Agent, or Firm—Krass & Young

[57] ABSTRACT

A vapor vent valve for automotive fuel tanks is provided with bayonet-insertion, turn-to-lock mounting structure mating with a recessed opening in the top wall of a vehicle fuel tank. An O-ring mounted on the valve body provides a fluid-tight radial compression seal between the valve body and the fuel tank wall to prevent leakage of fuel and fuel vapor therebetween. An annular plastic spring washer is disposed between a top flange of the valve and the top wall of the tank to create an axial tension between valve and tank and also to act as an external weather seal. The spring has an integral means to prevent over-center flexing and shape inversion.

6 Claims, 1 Drawing Sheet

FUEL TANK VAPOR VENT VALVE AND SEAL

FIELD OF THE INVENTION

This invention relates to vapor vent valves for vehicle fuel tanks, and particularly to a vapor vent valve housing and seal combination which is easily mounted on a fuel tank and which is constructed to provide a reliable seal with the tank under widely varying conditions.

Co-pending application for patent U.S.S.N. 431,624 now U.S. Pat. No. 4,960,153, discloses an improved valve and valve mount construction for a vehicle fuel tank wherein the valve body is inserted axially into a shaped aperture in the base of a recess in the upper fuel tank wall. The valve body is thereafter turned about its longitudinal axis to lock the valve body to the tank wall. A spring located between a circumferential flange near the top of the valve body and the adjacent area of the tank wall provides constant axial bias to maintain the desired spatial relationship between the valve body and the tank.

The spring disclosed in the co-pending application is of the sinusoidal band type and performs its axial bias function adequately. It has, however, been found desirable to also achieve a weather seal between the valve body and the tank wall at the top of the aforementioned recess thereby to prevent moisture and foreign matter from entering the recess. This invention is directed toward the satisfaction of that objective.

SUMMARY OF THE INVENTION

The present invention is accordingly directed to an improved vent valve for vehicle fuel tanks. The valve body is easily, securely and reliably locked into the tank in a simple operation and maintains a fluid-tight seal between the valve body and the tank wall independent of the locking engagement between the valve and the tank. Moreover, the invention provides an effective weather seal between the valve body and the surrounding tank wall.

The invention comprises a rigid valve body adapted to be inserted axially into and matingly received by an aperture in the fuel tank wall. The valve body is provided with a so-called bayonet locking structure in which, after axial insertion fully into the tank aperture, the valve body is rotated about is own axis to cause a tank flange to enter into a circumferential groove in the valve body. A flexible spring having a frustoconical, outer shape is disposed between a valve top flange and the tank top wall to both axially bias and seal the junction between valve and tank.

In an illustrated and preferred embodiment, the spring is frustoconical and washer-like in shape and flexes in the manner of a Belleville spring. However, this spring is provided with integral means to prevent excessive, over-center flexing of the spring and shape inversion which might occur during insertion and/or use.

Accordingly, the valve body is releasably locked into position in the fuel tank with a simple, two-part bayonet-type motion: axial insertion against the spring, and a locking rotation over the camming elements.

In the illustrated embodiment, an O-ring seal is mounted on the valve body between the locking groove and the axial spring such that a second fluid-tight seal is created when the valve is axially inserted into the fuel tank opening. Rotating the valve housing to lock or unlock it from the fuel tank wall has no effect on the O-ring seal; i.e., the O-ring maintains an effective seal with the fuel tank wall independent of the locking structure and the external spring seal.

The O-ring is of sufficient radial compliance to maintain the seal regardless of contraction and expansion of the tank wall opening due to temperature and pressure variations in the tank, and is frictionally tight enough on the valve body to stay on during shipping and handling of the valve body. The O-ring is also of sufficient diameter to maintain the axial spring on the upper portion of the valve body.

DETAILED DESCRIPTION OF THE ILLUSTRATED EMBODIMENT

Figure 1:
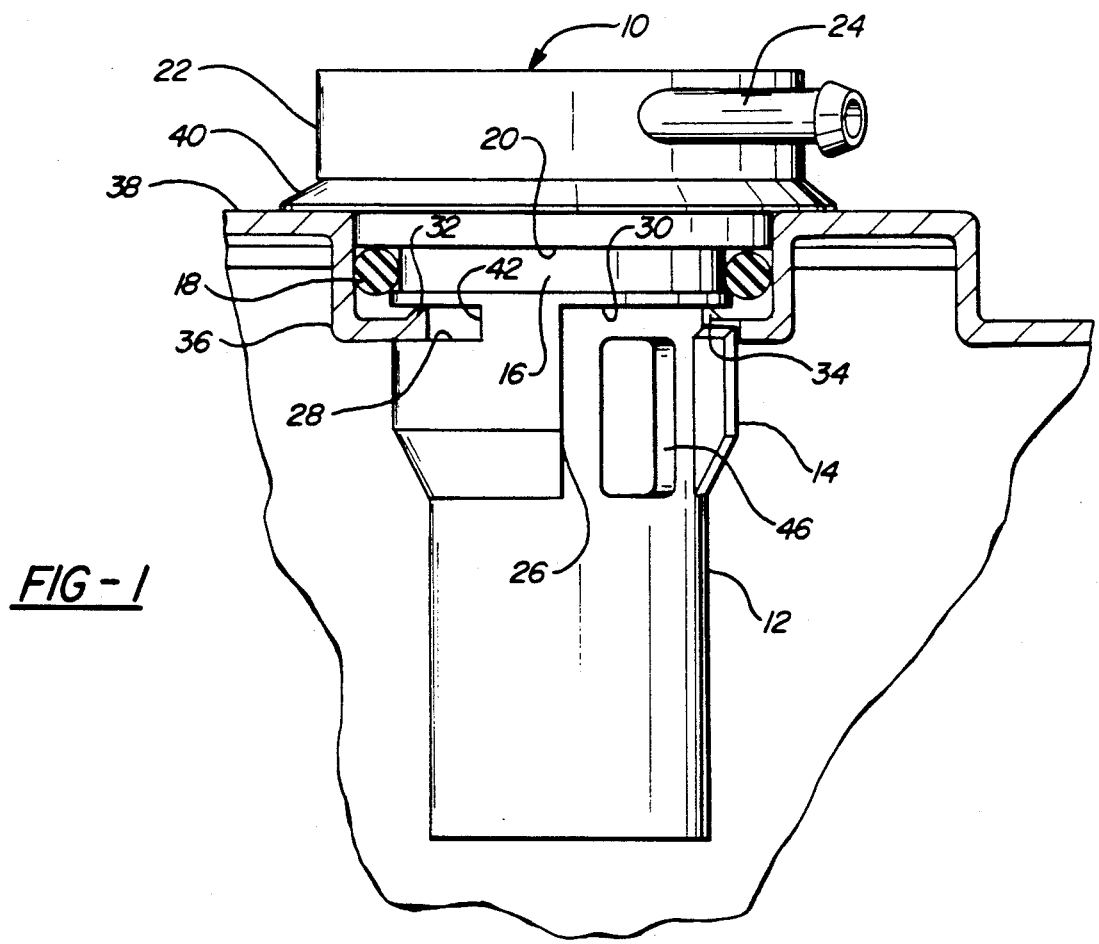
FIG. 1 is a side view, partially in section, of a vent valve mounted on a fuel tank according to the present invention.
Figure 2:
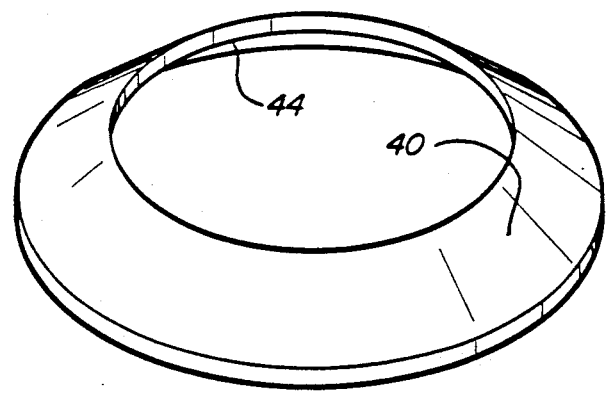
FIG. 2 is a perspective view of the spring seal of FIG. 1.
Figure 3:
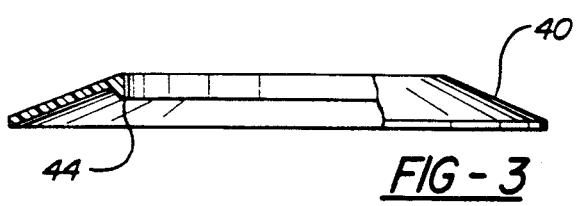
FIG. 3 is a side view, partly in section, of the spring seal of FIG. 2 showing the over-center flex preventing mechanism.

Referring now to FIGS. 1, 2 and 3, the vapor vent valve of the present invention comprises a hollow valve body 10 having a lower cylindrical portion 12, an intermediate portion 14 of slightly larger diameter, an annular O-ring seat 16 for an O-ring seal 18, an inner flange 20 contiguous with and above seat 16, and a head portion 22 the diameter of which is larger than that of both portions 12 and 14. An integral fitting 24 permits the actual valve (not shown) in body 10 to be connected, for example, to a carbon canister carried on board an automotive vehicle. Valve body 10 is preferably molded, rigid plastic.

A frustoconical plastic spring 40 is disposed between the undersurface of head portion 22 and the top wall of vehicle fuel tank 38 to provide an axial bias between valve body 10 and fuel tank 38 as hereinafter described. In addition, spring 40 provides an effective weather seal as is also hereinafter described.

As disclosed in co-pending application Ser. No. 431,624 now U.S. Pat. No. 4,960,153, the entire disclosure of which his is incorporated herein by reference, body portion 14 has formed therein on opposite side thereof L-shaped bayonet locking structure comprising diametrically opposite longitudinal keyways 26 and contiguous horizontal grooves 28 and 30 which cooperate with the inwardly projecting tongues 32 and 34 of a shaped aperture in the bottom of a shallow recess 36 in fuel tank 38. The tongues 32 and 34 are received in keyways slots 26 in valve body portion 14 to permit full axial insertion of body 10 into the fuel tank aperture until the bottom annular surface of spring 40 rests on the top wall of fuel tank 38. With the application of slight axial force, spring 40 is compressed; i.e., the skirt portion flexes outwardly, to bring the grooves 28 and 30 into alignment with the tongues 32 and 34 of the shaped aperture. The valve body is then rotated 90° to turn the tongues against the groove stops. The axial bias exerted by spring 40, together with integral camming bumps at the entrances to grooves 28 and 30 retain the valve 10 in the tank 38.

Windows 46 communicating with the hollow interior of valve body 10 are formed in opposite sides thereof coincident with and within keyways 26 to permit the passage of fuel vapor from the fuel tank through the valve body and the valve structure to the carbon canister as stated. A suitable valve is disclosed in U.S. Pat. No. 4,646,772 issued Mar. 3, 1987.

Referring specifically to FIGS. 2 and 3, spring/seal 40 is shown to exhibit a frustoconical shape both internally and externally; i.e., it is a conical, washer-like structure which behaves as a Belleville spring. Under axial load, the height of the spring 40 is reduced and the skirt portion flexes outwardly as forces build up on the spring.

As is well known, Belleville springs or washers can actually flex over-center until the body of the device actually redevelops in an inverted shape. As such behavior is undesirable in the present circumstances, thickened inner diameter portion 44 is integrally molded into spring 40 to prevent over-center flexing with consequent shape inversion.

The spring 40 is preferably made from a polymeric resin such as "Ultem" which is available from the General Electric Company. It can, however, be made from other resilient, weather resistant materials.

Located as it is between the top flange or undersurface of head 22 and the top wall of tank 38, spring 40 acts as both axial biassing force source and weather seal to keep moisture and foreign matter out of the recess 36 and the area of the primary seal provided by O-ring 18.

I claim:

1. A vent valve assembly for removable locking insertion into a shaped aperture in the wall of a vehicle fuel tank, comprising:

a rigid valve body;

locking means on said valve body operatively engaging said aperture when said valve body is axially inserted therein and rotated relative thereto to provide axially interfering contact between said valve body and said tank wall; and spring means disposed between a portion of said valve body projecting externally of said tank and an external surface of said tank to provide both axial bias and a weather seal between valve body and tank;

wherein said spring means comprises a frusto-conical, flexible washer having an annular base and an inner diameter, said annular base engaging the external surface of said fuel tank wall when said valve body is lockingly engaged with said aperture.

2. Apparatus as defined in claim 1 wherein said spring includes means for preventing over-center flexing thereof.

3. Apparatus as defined in claim 2 wherein said over-center flex prevention means includes a stiffening ring formed contiguous to the inner diameter.

4. Apparatus as defined in claim 1 wherein said spring is plastic.

5. Apparatus as defined in claim 1 wherein said locking means further comprises bayonet-type cam and groove means formed in said valve body mating with at least a portion of said aperture.

6. Apparatus as defined in claim 1 wherein said tank wall is recessed adjacent said aperture, the combination further including an O-ring seal disposed radially between the valve body and the recessed tank wall.

* * * * *